May 7, 1946.  T. R. JONES  2,399,807
FLOATING TOOL HOLDER
Filed April 15, 1943
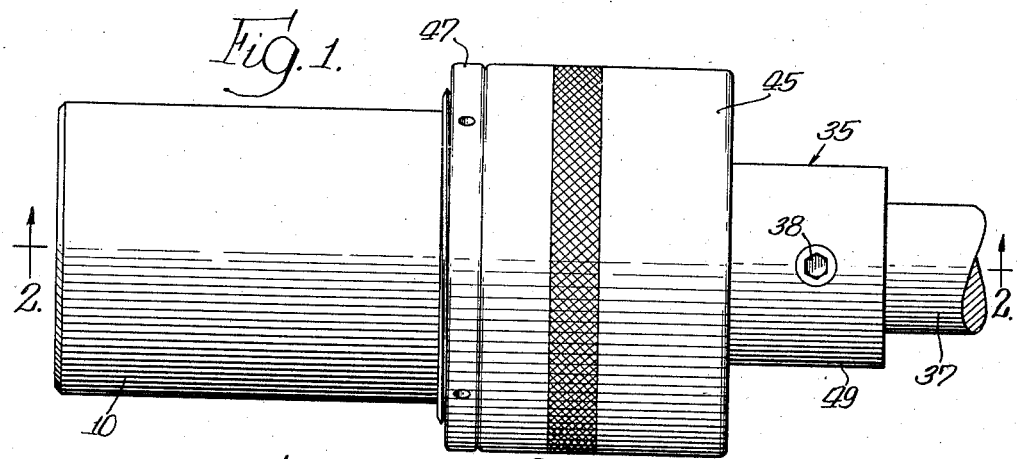
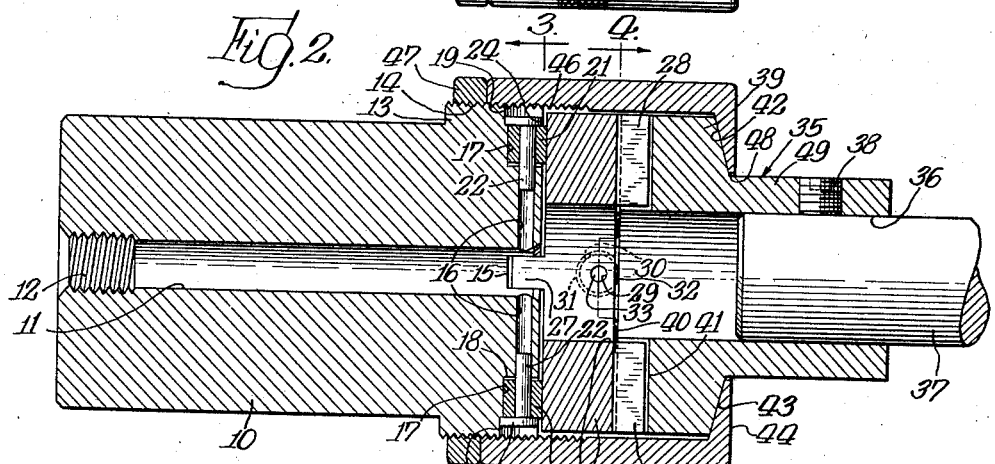
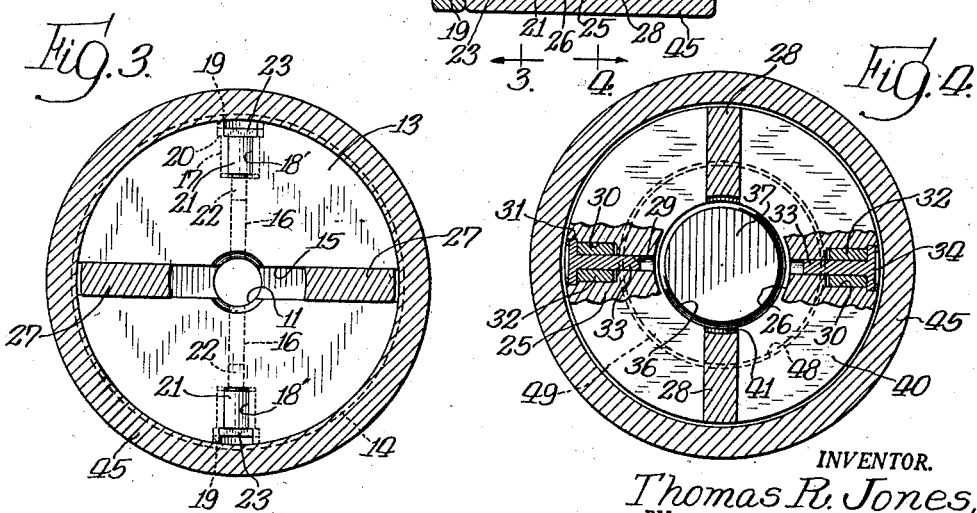
INVENTOR.
Thomas R. Jones,
BY John P. Smith
Atty.

Patented May 7, 1946

2,399,807

UNITED STATES PATENT OFFICE 2,399,807

FLOATING TOOLHOLDER

Thomas R. Jones, Chicago, Ill.

Application April 15, 1943, Serial No. 483,217

16 Claims. (Cl. 279—16)

The present invention relates generally to a floating tool holder, but more particularly to a novel and improved type of holder which is adapted to support a tool, such as a reamer, on the live or dead spindle of a lathe, drill press or other similar machine, so that the tool supported thereon may have a floating action with respect to the holder or drive spindle of the machine.

Another object of the invention is to provide a novel and improved floating type tool holder for supporting a tool on the live or dead spindle of a machine whereby the tool may float radially with respect to the holder and live spindle of the machine while maintaining the longitudinal axis of the tool in parallelism with the longitudinal axis of the drive spindle.

Another object of the invention is to provide a novel and improved type of floating tool holder whereby the longitudinal axis of the tool supported thereon may be angularly displaced with respect to the longitudinal axis of the live spindle.

A still further object of the invention is to provide a novel and improved type of floating tool holder whereby adjustments may be made for supporting the longitudinal axis of the tool in rigid alignment with the longitudinal axis of the live spindle.

A still further object of the invention is to provide a novel and improved construction of tool holder in which the floating member of the tool holder is provided with a conical or beveled portion which, in turn, cooperates with a complementary beveled member of the tool holder for maintaining and returning the floating member of the tool holder to its normal axial alignment with that of the tool holder proper on the live or dead spindle.

A still further object of the invention is to provide a novel and improved construction of floating type tool holder in which adjustment is provided for controlling the amount of floating action of the tool supported therein with respect to the tool holder.

These and other objects are accomplished by providing a construction and an arrangement of the various parts in the manner hereinafter described and particularly pointed out in the appended claims.

Referring to the drawing:

Fig. 1 is a top plan view of my improved construction of floating type tool holder showing a fragmentary portion of a tool carried therein;

Fig. 2 is a longitudinal cross sectional view taken on the line 2—2 in Fig. 1 of the drawing;

Fig. 3 is a cross sectional view taken on the line 3—3 in Fig. 2 of the drawing; and Fig. 4 is a cross sectional view taken on the line 4—4 in Fig. 2.

In illustrating one form my invention may assume in practice, I have shown the same as comprising a main or drive member 10, which is preferably cylindrical in form. This drive member 10 of the holder is provided with an axial bore 11 extending therethrough. Adjacent the outer end of the bore 11 is an internal threaded portion 12 which is for the purpose of securing the holder and drive member 10 to the threaded portion of a live or dead spindle of a lathe, screw machine or other similar type of machine. Formed on the other end of the drive member 10 of the holder is an enlarged flange 13 which has its periphery threaded as shown at 14. Extending across the inner face of the flange 13 is a rectangular recess or slot 15. This recess or slot 15 extends completely across the face of the flange 13 and intersects the longitudinal axis of the drive member 10. Located at right angles to the slot or recess 15 and slightly to one side of the surface of the inner face of the flange 13 are diametrally projecting bores 16. The outer portions of these bores 16 terminate in relatively larger bores 17 so as to form shoulders 18. These bores 17 are located with respect to the inner surface of the flange 13 so as to provide rectangular openings therein, as shown at 18'. These openings 18' permit antifriction rollers, hereinafter described, to project beyond the surface of the flange 13. The outer ends of each of the circular bores 17 terminate in a relatively larger bores 19, forming shoulders 20 therebetween. Mounted in the circular recesses 17 are anti-friction rollers 21, which in turn, are journaled on shafts or pins 22 which have their inner ends supported in the outer ends of the bores 16 of the drive member 10 and their outer ends supported by flanged heads 23 formed integrally with the pins. The heads 23 of the pins 22 are of a diameter complementary to the circular recesses 19 and fit snugly therein. A portion of these circular heads are flattened as shown at 24 so as not to project beyond the inner surface of the flange portion 13 of the drive member 10. Positioned adjacent the inner surface of the base member 10 and movable on the rollers 21 is a relatively movable intermediate washer-like member or collar 25 which has an axial bore 26 in the center thereof. Located on one surface of the member 25 are laterally projecting and radially extending rectangular aligned lugs 27 which are complementary to and are adapted to seat in the radial recesses 15 of the drive member 10 for permitting relative movement of the member 25 with respect to the member 10. From the above it will be obvious that the collar 25 is free to move or reciprocate laterally on the rollers 21 in a direction parallel to the lugs 27 and at the same time may rock or oscillate on these rollers as a fulcrum. Located on the other or opposite surface of the intermediate member 25 and arranged right angularly with respect to the lugs 27 are laterally projecting and radially disposed rectangular aligned lugs 28. Located opposite the lugs 27 and at right angles to the lugs 28 of the collar member 25 are radially disposed bores 29. The outer portion of these bores 29 terminate in relatively larger concentric bores or recesses 30. The outer ends of the bores 30 terminate in relatively larger circular recesses 31. The bores 30 are located with respect to the surface of the washer 25 so as to permit anti-friction rollers hereinafter described to protrude therefrom in engagement with a floating or driven member hereinafter described. Mounted in the recess 30 are anti-friction rollers 32. These rollers 32 are journaled on pins 33 which have their inner ends seated in the bores 29 and their outer ends supported by flanges or heads 34 formed integrally with the pins 33. The heads 34 are seated in the complementary recesses 31 located in the outer end of the member 25.

Mounted adjacent to and in driving relation with the member 25 is a floating or driven member of the holder as shown at 35. The inner face of the member 35 contacts the roller 32 so that the member 35 may laterally reciprocate on the rollers 32 in one direction with respect to the collar 25. At the same time, the aligned rollers 32 form in effect a fulcrum for the driven member 35 so as to permit said member to rock or oscillate in a plane with respect to the collar 25. It will therefore be obvious that since the intermediate member can oscillate or rock in one plane about the rollers 25 and the driven member 35 can oscillate or rock about the rollers 32 in a plane at right angles to the direction of movement of the member 25 on the rollers 21, the combined effect of this arrangement permits the universal movement to the driven member 35 and tool 37 held therein. Thus the tool may angularly displace itself in any direction with respect to the tool holder proper in aligning the tool with respect to the work. This member 35 is provided with a barrel portion 49 having a longitudinally extending bore projecting therethrough, as shown at 36, for the reception of a tool, such as a reamer, generally indicated by the reference character 37. The reamer 37 is secured in position in the member 35 by a set screw 38. The driven member 35 is provided with an enlarged flange, as shown at 39, which has an inner flat face as shown at 40. Extending across the face 40 of the flange 39 are rectangularly shaped and radially projecting recesses or slots 41 which are complementary to and adapted to receive the opposite lugs 28 formed on the member 25. The other face of the flange 39 is bevelled as shown at 42. The bevelled face forms in effect a conical surface on one side of the flange 39 and is complementary to a bevelled or conical face 43 formed on the inner surface of a flange 44 of an encasing coupling member 45. This coupling 45 is cylindrical in shape and has an internal threaded portion as shown at 46. The internal threaded portion 46 is adapted to engage the threaded portion 14 of the drive member 10 for holding the parts in operative position with respect to each other and for effecting the adjustment in the manner hereinafter described. The coupling member 45 is locked in various positions of adjustment with respect to the drive member 10 by an internally threaded lock collar 47 mounted in threaded engagement with the threaded portion 14 of the member 10. The flange 44 of the coupling member 45 is provided with a concentrically arranged bore or opening 48, through which the barrel portion 49 of the driven member 35 protrudes. This bore 48 is slightly of larger diameter than the barrel portion 49 of the floating member 35 so as to permit and limit the floating action of this member with respect to the tool holder proper.

From the above description it will be obvious that the bevel or conical surface 42 of the floating member 35 in cooperation with the beveled or complementary surface 43 of the coupling member 45 not only performs the function of normally maintaining the axis of the tool in parallelism with respect to the tool holder proper and the driving or dead spindle of the machine, but also centers the floating member 35 with respect to the tool holder proper when the axis of the tool is angularly disposed with respect to the axis of the spindle of the machine.

Summarizing the advantages and the novel functions of operation of my improved floating tool holder, it will be obvious that I have not only provided a simple, compact, as well as efficient holder which is capable by reason of its adjustment to rigidly maintain the tool in coaxial alignment with the live or dead spindle of the machine or permit a floating motion of a tool held thereby, yet maintaining the tool or its longitudinal axis thereof in parallelism with the longitudinal axis of the drive spindle of the machine, or if the case requires, adjustment will permit the movement of the tool so that angular displacement of the longitudinal axis thereof with respect to the longitudinal axis of the drive spindle of the machine. The degree of displacement of the floating or driven member 35 which carries the tool 37 is primarily controlled by the adjustment of the coupling member 45 with respect to the drive member 10 and the limit of the floating movement of the tool is controlled by a combination of the threaded adjustment together with the differentiation in size of the bore 48 in the flange 44 and the diameter of the hub 49 of the floating member 35. It will also be obvious that the oppositely disposed and right angularly arranged lugs 27 and 28 formed on the collar 25 together with the anti-friction bearing member 21 and 32 combine to permit axial displacement in radial direction as well as angular displacement in any direction and the beveled surface heretofore described may either normally return or normally maintain the proper driving relationship between the parts of this tool holder depending upon the relative adjustment of the parts and the results desired by the operator.

In this connection it will be further observed that the two aligned rollers 21 arranged across the diameter of the inner face of and carried by the drive member 10 forms a fulcrum about which the intermediate member or collar 25 may rock or oscillate for permitting the collar 25 to angularly displace itself in one plane with respect to the drive member 10. Similarly, the aligned rollers 32 arranged across the diameter of and carried by the collar 25 forms a fulcrum for the driven member 35 and permits the member 35 to rock or oscillate thereon in one plane with respect to the collar 25. These rocking movements of these members about their respective fulcrums on the rollers 21 and 32 are at right angles with respect to one another, so as to produce in effect a universal connection whereby the driven member 35 as well as the tool held therein may be angularly displaced in any direction with respect to the tool holder proper. The rollers 21 and 32 also permits a floating movement bodily of the driven member 35 and the tool held therein while maintaining the longitudinal axis of the tool in parallelism with the longitudinal aixs of the tool holder proper.

This improved tool holder therefore permits the tool to automatically align itself with the work so that the tool may be either angularly or bodily displaced with respect to the tool holder proper, thus insuring accuracy in the operation of the machine and preventing the breaking of tools.

It will also be observed that the anti-friction members in addition to permitting the free movement of the floating member and connecting members also sustains the thrust load exerted on the tool holder to thereby increase the efficiency and adaptability of the tool or reamer to adjust or align itself with respect to the work.

While in the above specification I have described one embodiment which my invention may assume in practice, it will of course be understood that the same is capable of modification and that modification may be made without departing from the spirit and scope of the invention as expressed in the appended claims.

What I claim as my invention and desire to secure by letters patent is:

1. A floating tool holder comprising driving and driven members, each having diametral recesses in their opposed faces, a connecting member located between said faces and having opposite diametral lugs engageable with said recesses in said first named members, anti-friction members comprising rollers journaled on pins carried by certain of said members and positioned between the opposed faces of said connecting member, the axes of said rollers intersecting the longitudinal axis of said driving member, said anti-friction members forming fulcrums about which the adjacent member may rock, and a coupling member connecting said drive and driven members together.

2. A floating tool holder comprising driving and driven members, each having diametral recesses in their opposed faces, a connecting member located between said faces and having opposite diametral lugs engageable with the recesses in said first named members diametrically positioned fulcrums in the form of anti-friction members carried by certain of said first named members and positioned between the opposed faces of said drive and driven members and the opposite faces of said connecting member, said anti-friction members being located outside of said recesses, and a coupling member connecting said drive and driven members together.

3. A floating tool holder comprising driving and driven members, each having diametral recesses in their opposed faces, a connecting member located between said faces and having opposite diametral lugs engageable with the recesses in said first named members, fulcrum members positioned between the opposed faces of said drive and driven members and the opposite faces of said connecting member, said fulcrum members comprising rollers journaled on pins carried by said drive and connecting members respectively, the axes of said rollers intersecting the longitudinal axis of said driving member, and a coupling member embracing all of said members.

4. A floating tool holder comprising drive and driven members, each having diametral recesses in their opposed faces, a connecting member located between said faces and having opposite diametral lugs engageable with the recesses in the first named members, fulcrum members positioned between the opposed faces of said drive and driven members and the opposite faces of said connecting member, said fulcrum members comprising rollers journaled on pins carried by said drive and connecting members respectively, the axes of said rollers intersecting the longitudinal axis of said drive member being spaced from and located out of contact with the adjacent lugs respectively, and a coupling member embracing all of said members.

5. A floating tool holder comprising driving and driven members, each having diametral recesses in their opposed faces, a connecting member located between said faces and having opposed diametral lugs engageable with the recesses in said first named members, diametrally and oppositely disposed rollers journaled on one face of said drive member and engageable with one face of said connecting member for permitting said connecting member to rock and reciprocate thereon with respect to said drive member, diametrally and oppositely disposed rollers journaled on one face of said connecting member and engageable with one face of said driven member for permitting said driven member to rock and reciprocate thereon with respect to said connecting member, and a coupling member embracing all of said members.

6. A floating tool holder comprising driving and driven members, each having diametral recesses in their opposed faces, a connecting member located between said faces and having opposed diametral lugs engageable with the recesses in said first named members, diametrally and oppositely disposed roller journaled on one face of said drive member and engageable with one face of said connecting member for permitting said connecting member to rock and reciprocate thereon with respect to said drive member, diametrally and oppositely disposed rollers journaled on one face of said connecting member and engageable with one face of said driven member for permitting said driven member to rock and reciprocate thereon with respect to said connecting member, the axes of said first named rollers being located at right angles with respect to the axes of said last named rollers, and a coupling member embracing all of said members.

7. A tool holder comprising a drive member, a driven member, means for connecting said members together, two separate sets of aligned rollers interposed between said first named means and said respective drive and driven members whereby said driven member may fulcrum about said rollers for angularly disposing itself with respect to said drive member, the axes of said separate sets of rollers arranged at right angles to one another and intersecting the longitudinal axis of said drive member, and a coupling member embracing all of said members for maintaining said members in operative relationship with respect to each other.

8. A tool holder comprising a drive member, a driven member, an intermediate member operatively connecting said drive member with said driven member, an encasing member embracing all of said members, means interposed between said intermediate member and said respective drive and driven members whereby said driven member may fulcrum and bodily displace itself with respect to said drive member, said means including aligned rollers whose axes extend across the diameter of said drive member, and means formed on said encasing member and constantly engageable with said driven member for normally urging said driven member in axial alignment with said drive member during the operation of said tool holder.

9. A tool holder comprising a drive member, a driven member, an intermediate member operatively connecting said drive member with said driven member, a coupling member embracing all of said members, fulcrum means interposed between said intermediate member and said respective drive and driven members whereby said driven member may fulcrum and bodily displace itself with respect to said drive member, said fulcrum means extending across the diameter and intersecting the axis of said drive member, a conically shaped surface formed on said driven member, and a complementary conically shaped surface formed on said coupling member and constantly engageable with the conically shaped surface on said driven member for normally retaining said driven member in axial alignment with said drive member during the operation of said tool holder.

10. A floating tool holder comprising driving and driven members, each having diametral recesses in their opposed faces, a connecting member located between said faces and having opposed diametral lugs engageable with the recesses in said first named members, rollers located adjacent said faces whereby said driven member may fulcrum and bodily displace itself with respect to said driving member, the axes of said rollers intersecting the longitudinal axis of said driving member, said driven member having a conically shaped face on one side thereof, and a coupling member having a complementary conically shaped face engageable with the conically shaped face of said driven member for normally centering said driven member with respect to said coupling member.

11. A floating tool holder comprising driving and driven members, each having diametral recesses in their opposed faces, a connecting member located between said faces and having opposed diametral lugs engageable with the recesses in said first named members, anti-friction members positioned between the opposed faces of said drive and driven members and the opposed faces of said connecting member whereby said driven member may fulcrum and bodily displace itself with respect to said drive member, said anti-friction members being located outside said recesses, and a coupling member connecting said drive and driven members together.

12. A floating tool holder comprising driving and driven members, each having diametral recesses in their opposed faces, a connecting member located between said faces and having opposed diametral lugs engageable with the recesses in said first named members, anti-friction members positioned between the opposed faces of said drive and driven members and the opposite faces of said connecting member, whereby said driven member may fulcrum and bodily displace itself with respect to said drive member, certain of said anti-friction members located at right angles with respect to certain other of said anti-friction members, said anti-friction members being located outside said recesses, and a coupling member connecting said drive and driven members together.

13. A floating tool holder comprising driving and driven members, each having diametral recesses in their opposed faces, a connecting member located between said faces and having opposed diametral lugs engageable with the recesses in said first named members, anti-friction members positioned between the opposed faces of said drive and driven members and the opposite faces of said connecting member whereby said driven member may fulcrum and bodily displace itself with respect to said drive member, said anti-friction members comprising rollers journaled on axes located at right angles with respect to the lugs formed on said connecting member, said anti-friction members contacting only the opposed faces of the adjacent members, and a coupling member connecting said drive and driven members together.

14. A floating tool holder comprising driving and driven members, each having diametral recesses in their opposed faces, a connecting member located between said faces and having opposed diametral lugs arranged at right angles with respect to each other and engageable with the respective recesses of said drive and driven members, fulcrum members comprising rollers positioned between the opposed faces of said drive and driven members and the opposite faces of said connecting member, said rollers having their axes located at right angles with respect to the adjacent lugs on said connecting member, and a coupling member connecting said drive and driven members together.

15. A floating tool holder comprising driving and driven members, each having diametral recesses in their opposed faces, a connecting member located between said faces and having opposed diametral lugs arranged at right angles with respect to each other and engageable with the respective recesses of said drive and driven members, fulcrum members comprising rollers positioned between the opposed faces of said drive and driven members and the opposite faces of said connecting member, the axes of said rollers being located at right angles with respect to the adjacent lugs on said connecting member, said driven member having a conically shaped surface on one side thereof, and a coupling member for connecting said drive and driven members together and having a complementary conically shaped surface engageable with said driven member.

16. A floating tool holder comprising driving and driven members, each having diametral recesses in their opposed faces, a connecting member located between said faces and having opposite diametral lugs arranged at right angles with respect to each other and engageable with the respective recesses of said drive and driven members, anti-friction rollers forming fulcrums positioned between the opposed faces of said drive and driven members and the opposite faces of said connecting member, the axes of said rollers being located at right angles with respect to the adjacent lugs on said connecting member, an adjustable coupling member for connecting said drive and driven members together, and angularly disposed surfaces formed on said driven and coupling members and engageable with each other for guiding said driven member with respect to said holder.

THOMAS R. JONES.